Aug. 18, 1925.

G. K. BOUGHNER

CLAMP

Filed Feb. 27, 1924

1,550,496

INVENTOR:
GEORGE K. BOUGHNER,
BY
Graham + Lowe
ATTORNEYS.

Patented Aug. 18, 1925.

1,550,496

UNITED STATES PATENT OFFICE.

GEORGE K. BOUGHNER, OF YORBA LINDA, CALIFORNIA.

CLAMP.

Application filed February 27, 1924. Serial No. 695,597.

*To all whom it may concern:*

Be it known that I, GEORGE K. BOUGHNER, a citizen of the United States, residing at Yorba Linda, in the county of Orange and State of California, have invented a new and useful Clamp, of which the following is a specification.

My present invention being referred to as a clamp, it may be understood to be an object of this invention to provide novel and effective means for engaging and securely retaining rods or cables or other articles in a predetermined position or relationship.

It is an object of this invention to provide means comprising two main compression elements or levers, which may be compared with the complemental parts of a nut cracker, for gripping any interposed article or articles; and in one advantageous embodiment of my invention, suitable for use in the gripping of pipes or rods, such as, for example, what are known as the "polish rods" of an oil well outfit, I may pivotally secure adjacent ends of the mentioned compression elements or levers to an interconnecting or base block.

At intermediate points on the mentioned compression elements or levers, I may provide novel resiliently supported work-engaging elements or slips of somewhat special design; and I may also provide said compression elements with a novel lock or locks and with novel operating or compressing means comprising a sliding wedge carrying a rack and movable by a hand lever, which may be effective for the rotation of what I may term a cam wedge or eccentric fulcrum meshing with said rack. The last named wedge may be a "graver" wedge in the sense that it may have an operating radius increasing, during its tightening movement, slightly more rapidly than would be required merely to compensate for a concurrent diminution in the thickness of the sliding wedge, at the points or lines of its successive engagements therewith; and it is a further object of this invention to provide an organization of the general character referred to, and suitable for employment in various types of clamps including drilling clamps as well as general utility clamps, with resilient locking means.

My polish rod clamp, for example, may comprise both a preliminary lock adapted to retain the operating parts in a position suitable for an application of power for a gripping effect and a final lock, and said final lock may comprise a toothed element adapted to engage a ratchet upon a side face of the mentioned sliding wedge, to releasably retain the same in gripping position.

Other objects of my invention will appear from the following description of an embodiment thereof especially suitable to use in the gripping of a polish rod, and from the appended claims, taken in connection with the accompanying drawings, in which Fig. 1 is a top plan view, with a part broken away.

Figure 1:
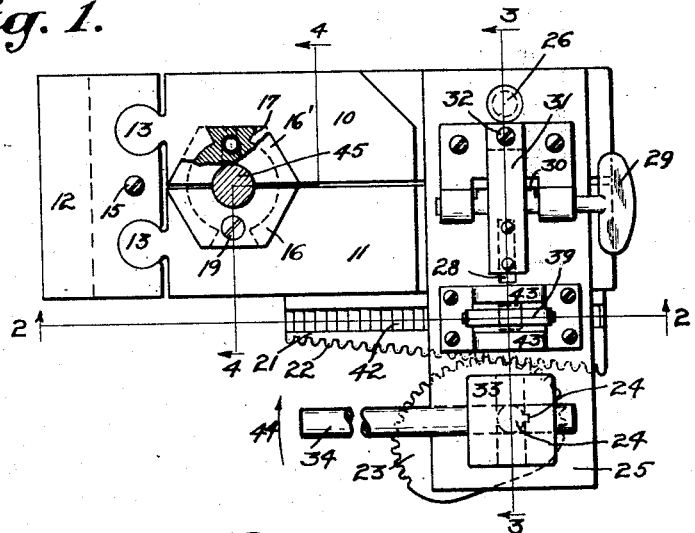
Figure 2:
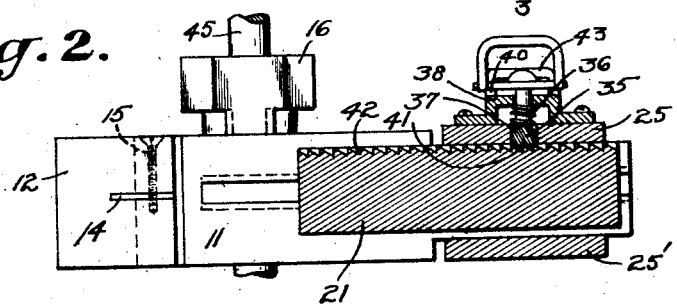
Fig. 2 is a sectional view which may be regarded as taken on the plane indicated by the line 2—2 of Fig. 1.
Figure 4:
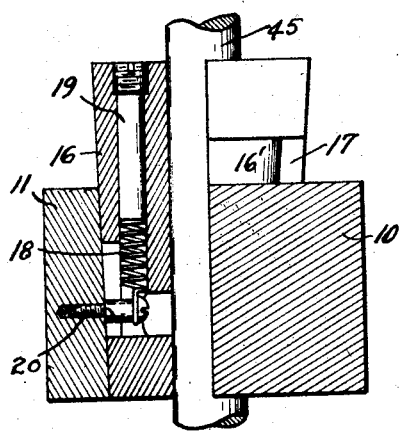
Fig. 4 is an enlarged detail view, which may be regarded as indicated by the broken line 4—4 of Fig. 1.

Referring to the details of that specific embodiment of my invention chosen for purposes of illustration, 10 and 11 may be the main compression elements of a clamp which, instead of being pivoted directly to one another, may be separately pivoted to a base block 12, as by means of parti-cylindrical projections 13, integral with the main compression elements 10 and 11 and shown as extending entirely through the base block 12, although retained therein by means of a plate 14, through which may extend a screw 15, both the projections 13 and the block 12 being slotted to receive said plate.

Article-engaging means of any preferred type may be provided on the inner faces of the respective compression elements 10, 11, the configuration of said article-engaging elements being obviously dependent upon the size and form of the articles to be retained thereby, and, in the embodiment of my invention here illustrated, I may employ, as suitable for the engagement of a polish rod, means such as the tapered slips 16, 16', shown as provided with dove-tailed guide or retaining feathers 17 and also with resilient returning means. The returning means referred to may be compressed springs 18, whose upper ends may be engaged by screws 19, secured in the respective slips, and whose lower or inner ends may be retained in any suitable way, as by screws 20, entering the respective compression elements. By such a construction as has been described, the slips 16, 16' may be normally retained in an elevated position in such manner that the application of a load thereon shall tend to improve their contact with, and engagement of, a rod or other article gripped.

In order to effect an initial gripping of an article, whether or not I employ resilient slips of the character just described, I may provide means comprising a plurality of wedges, one of which may be a sliding wedge 21, provided with a rack 22, the other then being a "graver" wedge, which may be mounted for rotation and suitable to be alternatively characterized as a cam wedge or "eccentric fulcrum" 23; and, in the embodiment of my invention herein illustrated, the eccentric fulcrum 23 may be mounted for pivotal rotation upon a shaft 24, extending through guide links 25, 25', both pivoted at 26 to the main compression element 10 and extending across the cooperating compression element 11 in such manner as to permit the interposition of the sliding wedge 21 in the manner illustrated, and engaged by a key 24', on 24.

Figure 3:
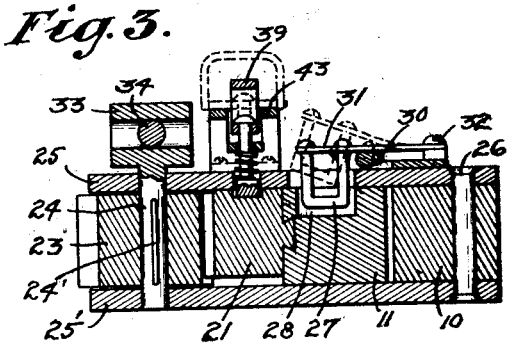
Fig. 3 is a sectional view which may be regarded as taken substantially in the plane indicated by the line 3—3 of Fig. 1.

In order to retain the compression elements 10 and 11 in a position favorable to the gripping of an article, such as a polish rod 45, I may employ a preliminary lock such as is shown in Figs. 1 and 3, this lock consisting essentially of a tongue or staple 27, adapted to enter and loosely fit within a slot 28 in compression element 11, or to be withdrawn therefrom by means such as the key 29, provided with a cam 30, engaging beneath the resilient supporting element 31, shown as carrying the mentioned projection 27 and as secured by a screw 32.

In addition to the mentioned preliminary lock, or independently thereof, I may provide a final lock, adapted to retain the sliding wedge 21 in any position to which it may be brought by a rotation of the eccentric fulcrum 23, shown as rigidly connected with a head 33, through which may extend a removable operating lever 34. My mentioned final lock may comprise a pawl or dog or toothed element 35, shown as provided with a spring 36, interposed between shoulders 37 and a fixed stop 38, the stem surrounded by said spring being surmounted by a handle 39, which may be dropped into a recess 40, to permit the teeth 41 to engage teeth 42 upon a lateral surface of the wedge 21, or which may alternatively be elevated into engagement with the upper surfaces of stops 43, shown as integral with the fixed stop 38.

It will be understood that, my clamp having been placed in approximate position upon a polish rod, or the like, and the key 29 having been so turned as to permit an entrance of the projection 27, of my preliminary lock, into the slot 28, and the sliding wedge 21 having been placed in a position suitable for an engagement of its teeth 22 by the corresponding teeth of the eccentric fulcrum 23, any rotation of the latter element about its axis 24, as by means of the lever 34, may be effective to tighten my clamp, by reason of the fact that, although the movement of the lever 34 in the direction indicated by the arrow 44 may tend to bring the narrower end of the said sliding wedge into an engaging position, the corresponding increase in the effective radius of the "graver" wedge or eccentric fulcrum 23 may more than offset the diminution in the thickness of said sliding wedge. For example, the "pitch" of the eccentric fulcrum 23 may be such as to produce a compressive movement amounting to an eighth of an inch for each advance of one inch in the sliding movement of wedge 21. It will, however, be understood that the ratios referred to must vary according to the specific use or the general use to which my clamp may be put, and also that the point or line of initial engagement between the sliding wedge 21 and the eccentric fulcrum 23 may be varied, to adapt my clamp to any desired use in the gripping of articles of different sizes.

Although I have herein described one complete embodiment of my invention, it will be understood that various features thereof may be independently employed, and also that various modifications might be made by those skilled in the art, without the slightest departure from the spirit and scope of my invention, as the same is indicated above and in the following claims.

I claim as my invention:

1. In a clamp, the combination of: two compression elements provided with separate pivots respectively integral therewith and relatively movable to effect a gripping action, means for effecting said gripping action, and a pair of resiliently supported slips, each mounted for sliding movement transversely of a compression element and retained against rotation therein.

2. In a clamp, the combination of: a pair of compression members pivotally secured to a common base block by integral particylindrical heads extending therein and a retaining plate extending through a slot in said block and through corresponding slots in said heads.

3. In a clap comprising a pair of compression members pivoted for relative movement and provided with intermediate engaging means, a pair of guide links secured to the outer end of one of said compression members and carrying an eccentric fulcrum, means for transmitting pressure through said fulcrum to the other of said compression members and separate resilient means for retaining said compression members either in a preliminary position or in a clamping position.

4. In a clamp comprising a pair of compression members pivotally mounted, the combination of: a pair of guide elements secured to one of said compression members and extending across the other of said members, a sliding wedge between said guide elements and movable longitudinally of one of said compression members, and means comprising a graver wedge rotatable to move said sliding wedge, the tightening movement of said rotatable wedge involving an approaching movement of the thinner end of said sliding wedge.

5. In a clamp comprising a pair of compression members pivotally mounted, the combination of: a pair of guide elements secured to one of said compression members and extending across the other of said members, a sliding wedge between said guide elements and movable longitudinally of one of said compression members; and means comprising a graver wedge rotatable to move said sliding wedge, the tightening effect obtainable by a given rotation of said rotatable wedge being dependent upon the initial relative position of said sliding wedge.

In testimony whereof, I have hereunto set my hand at Los Angeles, California, this 18th day of February, 1924.

GEORGE K. BOUGHNER.